Aug. 12, 1952     H. G. KLEMM     2,606,486

PRESS WHEEL

Filed June 5, 1947

INVENTOR.
HERMAN G. KLEMM
BY
Carlson, Pitzner, Hubbard & Wolfe
ATTORNEYS

Patented Aug. 12, 1952

2,606,486

UNITED STATES PATENT OFFICE 2,606,486

PRESS WHEEL

Herman G. Klemm, Birmingham, Mich., assignor to Harry Ferguson, Inc., Detroit, Mich., a corporation of Delaware Application June 5, 1947, Serial No. 752,607

1 Claim. (Cl. 97—56)

The present invention pertains generally to ground engaging disk wheels and more specifically to a disk wheel of the foregoing type which will be suitable for high speed agricultural use.

The tendency of the ground engaging wheels of agricultural machinery to pick up soft earth from a properly prepared seed bed has long been a matter of common knowledge. Until recently, this phenomenon has presented no serious difficulties with respect to the construction and operation of such equipment. With the advent of modern high speed farm machinery, however, a problem has arisen due to the earth slinging action of the wheels resulting from the increased centrifugal force. Such action is particularly objectionable in the case of tractor drawn planting implements having disk press wheels, the latter tending to throw outwardly any loose earth which might have accumulated in the space between the disks and the inner peripheries of the treads. Of necessity, wheels of this type are located at or near the longitudinal center line of the tractor, with the result that at high speed a stream of earth is thrown forwardly with considerable force against the tractor, the implement, various control mechanisms, and the operator.

Accordingly, one of the objects of the invention is to provide a disk wheel which will be particularly well suited for high speed operation on a normal, properly prepared seed bed.

Another object is to provide an improved press wheel for agricultural use and in which the tendency to sling accumulations of loose earth from the inner peripheries of the wheel treads will be substantially eliminated.

A further object is to provide a press wheel which may be inexpensively constructed of relatively light, dished, sheet metal stampings, so arranged that additional rigidity is obtained in the tread portion.

Further objects and advantages will become apparent as the following description proceeds, and from the accompanying drawings, in which.

Figures 1, 2:
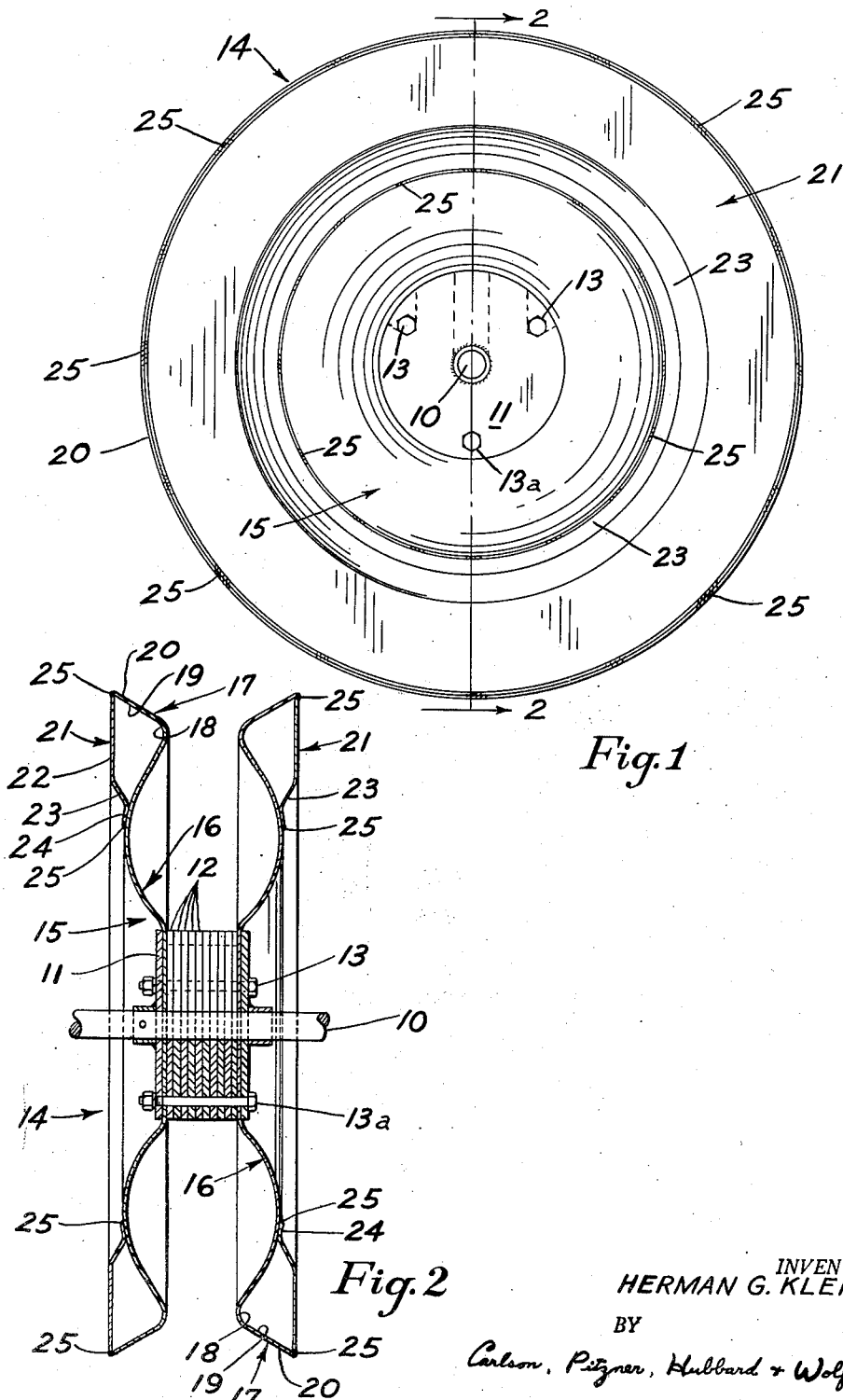
Figure 1 is a side or face view of a press wheel embodying the invention.
Fig. 2 is a sectional view of the wheel of Fig. 1 taken along line 2—2 of that figure.

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary, to cover all modifications and alternative constructions falling within the spirit and scope of the invention as expressed in the appended claim.

Referring to the drawings, an illustrative embodiment of the present invention is shown in the form of a disk press wheel of the type commonly employed with a planting implement. The wheel includes an axle 10 which carries a hub assembly comprising a pair of axially spaced-apart hub flanges 11, a plurality of removable spacer disks 12, and a number of throughbolts 13. Clamped securely between the hub flanges 11 and the spacer disks 12 are a pair of axially adjustable wheel elements 14, having circumferentially spaced bolt holes which register with those of the hub parts to receive the throughbolts 13, 13a, and thereby permit the wheel assembly to be maintained as a rigid unit. The spacer disks 12 serve as an axial adjusting means for the wheel, the former being radially slotted so as to slip on or off the axle without disassembly of the wheel. To this same end, cutouts in lieu of holes are provided in the disks for receiving two of the throughbolts 13. Each disk does, however, have a hole for engagement with the third throughbolt 13a in order to prevent any radial displacement of the former. Thus the axial distance between the wheel elements 14 may readily be altered by removing the throughbolt 13a, loosening the others to a moderate extent, and radially inserting the desired number of disks 12 between the wheel elements, or removing disks therefrom. Disks so removed are merely transferred to the outer side of either wheel element and clamped between the element and the adjacent hub flange 11.

Each wheel element 14 is characterized by an outside face and a dished outside face 15 which for purposes of description may be divided into a bulbous annular portion 16 and a tread portion 17. As indicated in Fig. 2, the bulbous annular portion 16 and the tread portion 17 together define in each element a large, shallow, annular pocket 18.

When an unimproved press wheel, having elements similar to those heretofore described, is used in the soft earth of a properly prepared seed bed, it will sink down to a certain extent due to its own weight and also to the force exerted by its biasing spring, should one be used. As a natural incident to this exertion of pressure on the soil, loose earth outside the rim or tread portion 17 will fall into the pocket 18 and collect there. During the rotation of the wheel at speeds within the normal speed range of older agricultural machines, most of this material will be carried around through a part of one revolution, dropping to the ground at the point where its own weight overcomes centrifugal force. Very little earth will actually be thrown from the pocket 18 at low speeds, and that which is thrown is not really objectionable.

At high wheel speeds, however, a different situation exists, and to the best of applicant's knowledge has not been dealt with in the prior art. Under these conditions, the accumulations of soil in the pocket 18 are rapidly accelerated by the wheel element until the centrifugal force acting on them becomes sufficiently great to move them along the outwardly sloping, frusto-conical, inner periphery 19 of the tread portion 17 to the edge thereof, whereupon they are slung forwardly by the wheel with substantial force. A contributing factor to the occurrence of this phenomenon at high speed is the fact that in order to produce it the centrifugal force must overcome, not only the friction between the surface of the pocket 18 and the earth therein, but also an opposing force due to the trapping effect of the tread portion 17 on the earth in the pocket.

In accordance with the invention, means is provided for substantially preventing each wheel element 14 from slinging accumulations of soil or earth from the annular pocket 18 of its dished outer face 15. Such means comprises an annular shield 21 rigidly secured to the wheel element 14 so as to block off the pocket 18 either completely or partially. Preferably, the shield 21 includes a large annular body 22 and a lateral stiffening offset 23 adjacent its inner circumference, the offset terminating in a relatively narrow attaching flange 24. When the shield is in place, the body 22 is disposed substantially parallel to the plane of rotation of the wheel element and the offset 23 is arranged within the circular line on the wheel element corresponding to the soil level encountered in the normal operation of the implement. Any convenient mode of attachment may be used, for example, circumferentially spaced tack welds 25. By the use of the preferred construction, the slinging of soil from the pocket 18 of each wheel element is effectively prevented by reason of the complete exclusion of all soil therefrom.

In addition to solving the earth throwing problem, the annular shield 21 serves as a stiffening flange for the tread portion 17 of the wheel element 14. This is particularly advantageous where the wheel is constructed of relatively light sheet metal stampings. Another advantage derived from the use of the shield as heretofore outlined is the ease with which a wheel so equipped may be cleaned, as compared with an unimproved wheel. A further beneficial result obtained by reason of the shield is the improvement it produces in the general appearance of the wheel.

I claim as my invention:

A press wheel for use in an agricultural implement and comprising, in combination, a hub assembly, a pair of axially spaced disk wheel elements secured to said hub assembly, each of said elements having an inside face and an outside face, each said outside face including a bulbous annular portion surrounding said hub assembly, an outwardly flared tread portion of substantially frusto-conical shape on each said wheel element and surrounding its respective bulbous annular portion, said bulbous annular portion and said tread portion together defining in each said wheel element a relatively large annular pocket of generally frusto-conical cross section, a pair of annular shields each rigidly attached to a corresponding one of said wheel elements at points on the apex of said bulbous annular portion thereof and just within the free lateral edge of said tread portion, each of said shields having a body parallel to the general plane of its associated disk wheel element, each of said annular shields also having a stiffening offset terminating in an attaching flange adjacent the inner circumference thereof, said shields being constructed and arranged to block off the pocket of each wheel element so as to prevent the slinging of soil therefrom when said wheel is in motion.

HERMAN G. KLEMM.

REFERENCES CITED

The following references are of record in the file of this patent:

UNITED STATES PATENTS

| Number | Name | Date |
|---|---|---|
| 14,539 | Washburn | Mar. 25, 1856 |
| 369,286 | Henderson | Aug. 30, 1887 |
| 457,945 | Wilson | Aug. 18, 1891 |
| 1,486,832 | Deady | Mar. 11, 1924 |
| 1,813,431 | Shoemaker | July 7, 1931 |
| 1,826,617 | Kuiper | Oct. 6, 1931 |
| 1,947,025 | Turner | Feb. 13, 1934 |
| 2,249,637 | Rietz | July 15, 1941 |
| 2,291,394 | Le Jeune | July 28, 1942 |
| 2,330,308 | Orendorff | Sept. 28, 1943 |
| 2,341,770 | Haas | Feb. 15, 1944 |